UNITED STATES PATENT OFFICE.

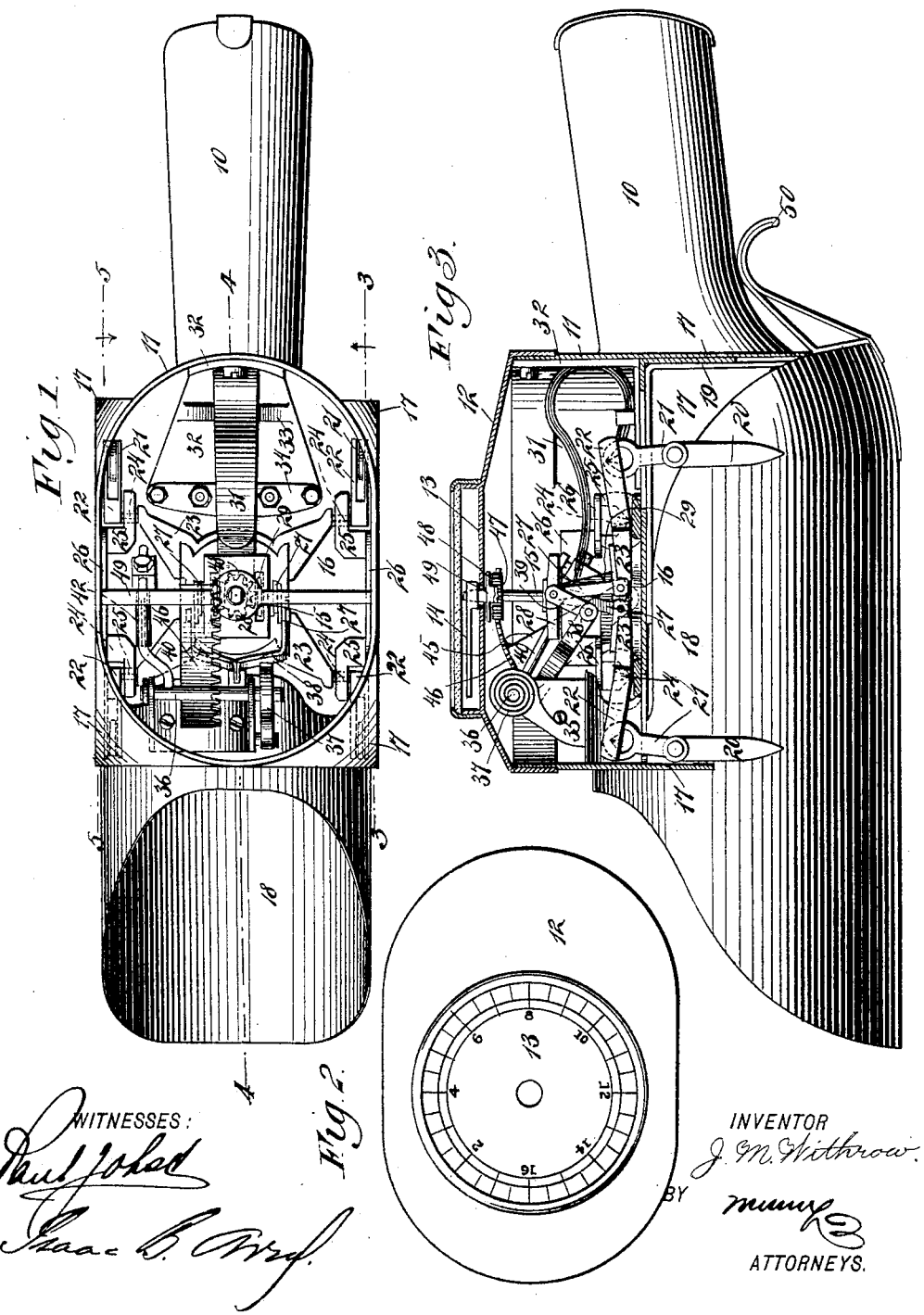

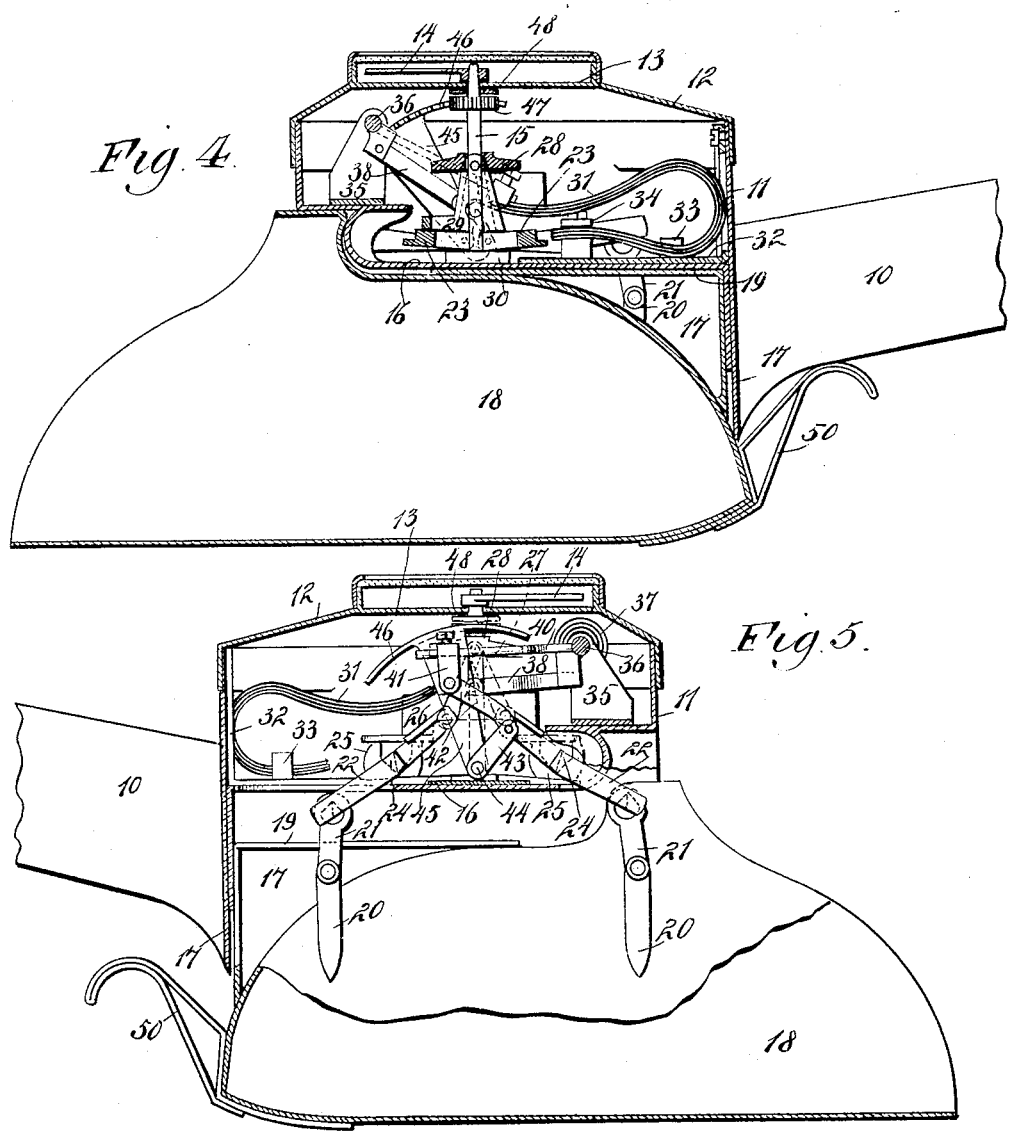

JOHN M. WITHROW, OF APPALACHICOLA, FLORIDA, ASSIGNOR TO HIMSELF AND WILLIAM HENRY THEOBALD, OF SAME PLACE.

WEIGHING-SCOOP.

SPECIFICATION forming part of Letters Patent No. 598,406, dated February 1, 1898.

Application filed June 25, 1897. Serial No. 642,303. (No model.)

*To all whom it may concern:*

Be it known that I, JOHN M. WITHROW, of Appalachicola, in the county of Franklin and State of Florida, have invented a new and Improved Weighing-Scoop, of which the following is a full, clear, and exact description.

This invention is a weighing-scoop having a handle portion and a pan, the former supporting scale mechanism and the latter having connection with the scale mechanism, so that goods placed in the pan will have their weight indicated by the scale mechanism.

This specification is the disclosure of one form of my invention, while the claims define the actual scope of the conception.

Reference is to be had to the accompanying drawings, forming a part of this specification, in which similar characters of reference indicate corresponding parts in all the figures.

Figure 1 is a plan view of the invention with the top of the scale-casing removed. Fig. 2 is a plan view of said top of the scale-casing. Fig. 3 is a sectional elevation on the line 3 3 of Fig. 1. Fig. 4 is a section on the line 4 4 of Fig. 1. Fig. 5 is a sectional elevation on the line 5 5 of Fig. 1 with certain parts omitted, and Fig. 6 is a detail section showing the carriage on the arbor of the indicator-hand.

The handle or main portion 10 has a scale-casing 11 secured thereon, said casing 11 having a snugly-fitting top 12 with a dial-face 13, over which plays an indicator-hand 14, carried on the arbor 15. The bottom of the casing 11 has a sunken portion 16, on which the major portion of the scale mechanism is carried, and the handle or main portion has skirts 17, forming a downwardly-opening cavity, receiving the upper portion of the pan 18. The pan 18 has an angular brace-plate 19 at its upper rear portion, such brace-plate 19 serving to bear snugly against the under face of the sunken portion 16 of the casing 11 and against the front extremity of the handle portion 10, whereby the pan 18 is held firmly in its upper position—that is, the position which the pan assumes when loaded.

Attached to each side of the pan 18 are two cleats 20, each having a link 21 pivoted thereto. Each link 21 has an eye at its upper end, and said links respectively receive in their eyes knife-edges carried by the respective arms 22. The arms 22 are arranged in pairs, the members of which are rigidly connected with each other by beams 23. This connection is effected through the medium of knife-edges 24, one for each arm 22. The knife-edges 24 respectively roll in bearings 25, which rest on the braced bottom 16 of the casing 11. The bearings 25 are rigidly connected in pairs by means of two plates 26, respectively secured rigidly against the inner faces of the sides of the casing 11. The plates 26 are visible in plan in Fig. 1. In Fig. 3 the plate 26 nearest the line of section is removed, together with the two bearings 25 that are attached to said plate, but the far bearings 25 and the plate 26 thereof are visible in Fig. 3. The same is true of Fig. 5, the far bearings 25 and the plate 26 thereof being shown and the near bearings being left out of view in the interest of clearness.

Each beam 23, with its arms 22, forms a lever rocking on a fulcrum formed by the knife-edges 24. The intermediate portion of each beam 23 has a link 27 pivoted to each side thereof, and said links have their upper ends pivoted to a carriage 28, sliding vertically on the arbor 15. The carriage 28 has a rigid hanging frame 29 with inwardly-projecting pins 30, as best shown in Fig. 6, and bearing on the pins 30 is the free end of a scroll-spring 31, held on an angular frame-plate 32 by means of the block 33 and an adjustable plate 34. Through these devices the tension of the spring 31 may be regulated. The spring 31 normally lifts the pan 18 to the position shown in Figs. 3, 4, and 5. Weight placed in the pan 18 will depress said pan, causing the arms 22 to swing down, which throws up the carriage 28 and raises the free end of the spring 31, such movement being against the tendency of said spring.

Mounted on the raised portion of the bottom of the casing 11 are two stanchions 35, which carry a rock-shaft 36, said shaft being held in a normal position by a volute spring 37. Fixed to the shaft 36 is a forked arm 38, the fork of the arm 38 spanning the carriage 28 and the link 27. Each end of the fork of the arm 38 is pivoted to a link 39, said links being respectively pivoted to the sides of the carriage 28. Movement of the carriage upward will lift the arm 38 and rock the shaft 36 against the tension of the spring 37. Fixed to the shaft 36 is a second arm 40, which carries at its free end a block 41, to which a link 42 is pivoted. The link 42 is in turn pivoted to an arm 43, carried on a rock-shaft 44, mounted on the depressed bottom 16 of the casing 11. Fixed to the rock-shaft 44 is an arm 45, which carries a segmental gear 46, meshing with a pinion 47, fixed on the arbor 15. By these means the arbor 15 is turned, and consequently the indicator 14 is made to play over the dial 13. The upper portion of the arbor 15 is held in a bearing 48, supported by arms 49, secured to the sides of the casing 11. The arms 49 are shown in plan in Fig. 1 and are shown broken away in Figs. 3 and 5.

As the carriage 28 moves vertically on the arbor 15 the shaft 36 is caused to rock, and this movement of the shaft 36 imparts a swinging movement to the arm 45 and its sector 46, which in turn rotates the arbor 15. A proper adjustment of the parts will cause the indicator 14 to show the weight of the material contained within the pan 18.

A thumb-plate 50, attached to the rear portion of the pan 18, enables the pan to be held rigidly if it is not desired to operate the weighing devices.

This weighing-scoop may be constructed in various sizes for use in the household, in hotels, and warehouses, and by retail merchants or others for weighing wheat, coal, or any article desired.

Various changes in the form, proportion, and minor details of my invention may be resorted to without departing from the spirit and scope thereof. Hence I do not consider myself limited to the precise construction herein shown, but believe that I am entitled to all such variations as come within the terms of my claims.

Having thus described my invention, I claim as new and desire to secure by Letters Patent—

1. The combination of a main or handle portion, a pan, a spring carried by the main or handle portion, a carriage pressed by the spring, and a connection between the pan and carriage, whereby to move the carriage against the tension of the spring, a rock-shaft having connection with and rocked by the carriage, an indicator, and gearing including a sector and pinion, by which the indicator is operated from the rock-shaft.

2. The combination of a main or handle portion, a pan, a lever carried by the main or handle portion, a connection between the lever and the pan, a carriage to which the lever is connected, whereby the carriage is moved, a spring pressing the carriage, a rock-shaft, a spring pressing the rock-shaft, an arm attached to the rock-shaft and connected with the carriage, a second arm attached to the rock-shaft, a second rock-shaft operated by the said second arm, a sector driven by the said second rock-shaft, an arbor, a gear fixed to the arbor and meshed with the sector, and an indicator carried by the arbor.

3. The combination of a main or handle portion having a casing, a pan, a spring-pressed carriage contained within the casing of the main or handle portion, a connection between the pan and carriage, whereby the carriage is moved as weight is applied to the pan, a rock-shaft having connection with the carriage, a sector driven by the rock-shaft, and an indicator controlled by the sector.

4. The combination of a frame-plate, a block held by the frame-plate, an adjustable tension-plate carried on the frame-plate, and a scroll-spring held in the block and having one end engaged by the tension-plate.

5. The combination of two members, two levers fulcrumed on one member, each lever being formed with an intermediate beam with an arm connected to each end of the beam, such connection being effected by knife-edges forming fulcrums on which the levers rock, connections between one of said members and the levers, a carriage sliding on the member having the levers, a connection between the levers and said carriage, a spring pressing the carriage, an indicator, and means for operating said indicator from the movement of the carriage.

6. In a scoop, the combination of a main or handle portion, a pan, levers mounted on the main or handle portion and having connection with the pan, a hanging frame connected with the levers, a carriage on which the hanging frame is held, a spring carried by the main or handle portion and pressing the hanging frame to keep the pan normally raised, and indicator mechanism operated from the carriage.

7. The combination of a main portion, a lever mounted on the main portion, a pan in connection with the lever, a carriage, a hanging frame supported by the carriage and connected with the lever, a spring pressing the hanging frame, and indicator mechanism operated from the carriage.

8. The combination of a spring-actuated rock-shaft, a carriage, an arm in connection with the carriage and with the rock-shaft to drive the rock-shaft from the carriage, a second arm attached to the rock-shaft, a second rock-shaft having connection with said second arm and driven thereby, a sector fixed to the second rock-shaft, and an indicator driven by the sector.

9. The combination of a main portion, a series of levers mounted thereon, a pan in connection with and supported by the levers, an arbor carried on the main portion, a carriage sliding on the arbor, a frame in connection with the carriage and with the levers, a spring pressing the frame whereby to hold the pan raised, a rock-shaft driven from the carriage, a second rock-shaft driven from the first rock-shaft, an indicator, and gearing transmitting movement to the indicator from the said second rock-shaft.

10. The combination of an arbor, a carriage sliding thereon, a lever, a link connected to the lever and to the carriage, a frame hanging from the carriage, a spring bearing on the frame, and an indicator driven from the carriage.

JOHN M. WITHROW.

Witnesses:
　WILLIAM H. THEOBALD,
　JAMES E. COTTER.